United States Patent
Räsänen

(10) Patent No.: US 10,015,771 B2
(45) Date of Patent: Jul. 3, 2018

(54) USER LOCATION WHEN ACCESSING A 3GPP NETWORK THROUGH A FIXED NETWORK

(71) Applicant: NOKIA SOLUTIONS AND NETWORKS OY, Espoo (FI)

(72) Inventor: Juha Antero Räsänen, Espoo (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 14/438,390

(22) PCT Filed: Oct. 29, 2012

(86) PCT No.: PCT/EP2012/071356
§ 371 (c)(1),
(2) Date: Apr. 24, 2015

(87) PCT Pub. No.: WO2014/067544
PCT Pub. Date: May 8, 2014

(65) Prior Publication Data
US 2015/0296478 A1    Oct. 15, 2015

(51) Int. Cl.
*H04W 64/00* (2009.01)
*H04L 29/06* (2006.01)
(Continued)

(52) U.S. Cl.
CPC ....... *H04W 64/003* (2013.01); *H04L 12/1407* (2013.01); *H04L 41/0893* (2013.01);
(Continued)

(58) Field of Classification Search
CPC ....... H04W 64/00; H04W 4/02; H04W 28/16; H04L 29/08657; G01S 5/0252; G01S 5/14
See application file for complete search history.

(56) References Cited

U.S. PATENT DOCUMENTS 8,498,651 B2 *  7/2013  Livanos ................ H04W 28/16
                                                              370/254
8,578,456 B2 * 11/2013  Lindholm ............. H04L 63/107
                                                              713/168
(Continued)

FOREIGN PATENT DOCUMENTS

FR    2 980 328 A1    3/2013

OTHER PUBLICATIONS

International Search Report dated Jul. 25, 2013 corresponding to International Patent Application No. PCT/EP2012/071356.
(Continued)

*Primary Examiner* — Omoniyi Obayanju
(74) *Attorney, Agent, or Firm* — Squire Patton Boggs (US) LLP

(57) ABSTRACT

The present invention addresses apparatuses, methods and computer program product for providing user location in network interworking (a mobile device accessing a 3GPP network through a broadband fixed network, a.k.a. UMA, WLan femto-Cell). When the policy and charging rules function PCRF contacts broadband network policy function BPCF after the IP-CAN session establishment for setting up an S9a control session between BPCF and PCRF, the BPCF uses the tunnel information, i.e. the IP tunnel address received from PCRF, to retrieve the line identifier of the subscriber line corresponding to the IP tunnel address of the DSLAM end of the tunnel, i.e. the IP address allocated earlier by the fixed broadband access network to the fixed network user/UE, and sends the line identifier to PCRF. Then, the PCRF sends the line identifier, accompanied with relevant 3GPP user/UE identification, to P-CSCF and possibly to other network elements that may need the user location information, e.g. to PCEF/PGW/GGSN.

11 Claims, 3 Drawing Sheets

(51) Int. Cl.
*H04M 7/12* (2006.01)
*H04L 12/24* (2006.01)
*H04L 12/14* (2006.01)
*H04W 4/02* (2018.01)

(52) U.S. Cl.
CPC .......... *H04L 65/103* (2013.01); *H04L 65/104* (2013.01); *H04L 65/1016* (2013.01); *H04M 7/12* (2013.01); *H04W 4/02* (2013.01); *H04M 2242/04* (2013.01)

(56) References Cited

U.S. PATENT DOCUMENTS

| | | | | |
|---|---|---|---|---|
| 2009/0170524 A1* | 7/2009 | Yoshizawa | ............ | H04W 28/16 455/453 |
| 2009/0311987 A1 | 12/2009 | Edge et al. | | |
| 2010/0130171 A1* | 5/2010 | Palanigounder | .... | H04L 63/0823 455/411 |
| 2010/0203898 A1* | 8/2010 | Noldus | ................... | H04W 8/12 455/456.1 |
| 2011/0039566 A1* | 2/2011 | Zee | ....................... | H04W 28/20 455/450 |
| 2011/0111767 A1* | 5/2011 | Livanos | ................ | H04W 28/16 455/452.2 |
| 2013/0041994 A1* | 2/2013 | Terrien | .................... | H04L 43/16 709/223 |
| 2014/0129839 A1* | 5/2014 | So | ....................... | H04L 61/2514 713/171 |
| 2015/0245196 A1* | 8/2015 | Rivas Molina | ....... | H04W 8/186 370/259 |

OTHER PUBLICATIONS

3GPP TS 23.139 V11.2.0 (Sep. 2012), Technical Specification, 3rd Generation Partnership Project; Technical Specification Group Services and System Aspects; 3GPP system-fixed broadband access network interworking; Stage 2 (Release 11), Sep. 11, 2012, pp. 1-88, XP050649046.

C1-062045; Nokia; "Location information for IMS emergency"; 2GPP TSG CT WG1 #44; Fairfax, US, Oct. 30-Nov. 3; Change Request.

3GPP TS 23.402 V11.4.0 (Sep. 2012); 3rd Generation Partnership Project; Technical Specification Group Services and System Aspects; Architecture enhancements for non-3GPP accesses (Release 11).

3GPP TS 23.203 V11.7.0 (Sep. 2012); 3rd Generation Partnership Project; Technical Specification Group Services and System Aspects; Policy and charging control architecture (Release 11).

3GPP TS 29.212 V11.6.0 (Sep. 2012); 3rd Generation Partnership Project; Technical Specification Group Core Network and Terminals; Policy and Charging Control (PCC); Reference points (Release 11).

3GPP TS 29.214 V11.6.0 (Sep. 2012); 3rd Generation Partnership Project; Technical Specification Group Core Network and Terminals; Policy and Charging Control over Rx reference point (Release 11).

RFC 6320; IETF; "Protocol for Access Node Control Mechanism in Broadband Networks"; S. Wadhwa, et al.; Oct. 2011.

* cited by examiner

USER LOCATION WHEN ACCESSING A 3GPP NETWORK THROUGH A FIXED NETWORK

FIELD OF THE INVENTION

The present invention generally relates to wired or wireless communication networks, and more specifically relates to a method, apparatus and computer program product for enabling user location in network interworking.

BACKGROUND

The 3$^{rd}$ generation partnership project 3GPP has standardized "Support for BroadBand Forum Accesses Interworking" within Rel-11 and is going on with the work within Rel-12.

According to the solution proposed therein, a fixed network access can be used by a 3GPP user equipment UE to access a 3GPP core network, transparently through the fixed network access. Transparency is made by (IP security) tunneling through the fixed network access. The access side between the UE and the fixed network access may comprise e.g. a wireless local area network WLAN or a Home Node-B (H(e)NB). A 3GPP UE may use the access e.g. to access IP multimedia subsystem IMS services offered by the 3GPP network operator.

An IP multimedia subsystem IMS, as standardized by 3GPP, uses user/UE location information provided by the network to the IMS network entities, such as a proxy call server control function P-CSCF. The location information is used e.g. for emergency services, e.g. to locate the user/UE in an emergency situation. The user location information (in case of different 3GPP and 3GPP2 accesses) is provided to P-CSCF by Policy and charging rules function PCRF, typically during a user session establishment, modification and (possibly also) termination.

For some reasons, 3GPP has not standardized a solution in Rel-11 for providing the user location to the IMS network (or in general, to the core network), when the 3GPP UE uses a fixed network access to access 3GPP core network. This prevents the use of location based services in the network, e.g. the essential action by an emergency service centre to locate the user in an emergency situation.

User location information known by the fixed access network cannot be transferred to the 3GPP core network in the same way as within a pure 3GPP access, because the UE uses an IP tunnel over the fixed access network, which prevents the fixed access network elements from inserting user location information into the bearer level signaling between the UE and 3GPP core network.

A permanent/static IP address or address range could obviously be used, at least in theory and through relevant configuration or interpretation, as location information. But IP address of a fixed broadband access user/UE may be either static or dynamic, and address ranges used by the fixed network operator may be changed by the operator in course of time. Consequently, an IP address or address range based location identification may not be reliable or usable.

Further related information can be derived from the following prior art documents:

3GPP TS 23.139 "3GPP System-Fixed Broadband Access Network Interworking; Stage 2"
3GPP TS 23.402 "Architecture enhancements for non-3GPP accesses"
3GPP TS 23.203 "Policy and Charging Control Architecture"
3GPP TS 29.212 "Policy and Charging Control (PCC) over Gx/Sd reference point"
3GPP TS 29.214 "Policy and Charging Control over Rx reference point"
IETF RFC 6320 "Protocol for Access Node Control Mechanism in Broadband Networks"

However, the current 3GPP specification offers no solution for user location indication to 3GPP core network for the fixed network interworking. This prevents the system e.g. to locate the user for emergency services, when the user accesses 3GPP network via fixed access.

SUMMARY OF THE INVENTION

In order to overcome the drawbacks of the prior art, it is an object underlying the present invention to provide a user location in network interworking. In particular, it is an object of the present invention to provide a method, apparatus and computer program product for enabling improved user location in network interworking.

According to a first aspect of the present invention, there is provided a method, comprising accessing of a user equipment to a wireless core network via a fixed network, retrieving user/UE location information, e.g. line identification information, of the subscriber line/location of the fixed network corresponding to the IP address (or user/UE identification of some other kind) allocated by the fixed network, and transmitting the user/UE location information to network elements, e.g. upon request thereof or unsolicited.

According to a second aspect of the present invention, there is provided an apparatus, which comprises an accessing means adapted to process accessing of a user equipment to a wireless core network via a fixed network, an obtaining means adapted to retrieve user/UE location information, e.g. line identification information, of the subscriber line/location of the fixed network corresponding to the IP address (or user/UE identification of some other kind) allocated by the fixed network, and a transmission means adapted to transmit the user/UE location information to network elements, e.g. upon request thereof or unsolicited.

According to a third aspect of the present invention, there is provided a computer program product comprising computer-executable components which, when the program is run on a computer, are configured to carry out the method according to the first aspect.

According to certain embodiments of the present invention, upon accessing to the network, a policy and charging rules function contacts a broadband network policy control function for setting up a control session therebetween, the broadband network policy control function uses an IP tunnel address received from the policy and charging rules function to retrieve the user/UE location information, e.g. the line identifier of the subscriber line, corresponding to the IP tunnel address of the digital subscriber line access multiplexer end of the tunnel.

According to another embodiment of the invention, the broadband network policy control function transmits the user/UE location information, e.g. the line identifier, to the policy and charging rules function.

In another embodiment, the transmission of the user/UE location information, e.g. the line identifier, is accompanied by user equipment identification information.

Furthermore, the line identification information comprises location information of the user equipment.

According to certain embodiments of the invention, the user location information is transmitted to at least one of a policy and charging enforcement function, packet data network gateway, and a general packet radio service gateway support node.

Advantageous further developments or modifications of the aforementioned exemplary aspects of the present invention are set out in the dependent claims.

BRIEF DESCRIPTION OF DRAWINGS

For a more complete understanding of example embodiments of the present invention, reference is now made to the following descriptions taken in connection with the accompanying drawings in which.

DESCRIPTION OF EXEMPLARY EMBODIMENTS

Figure 1:
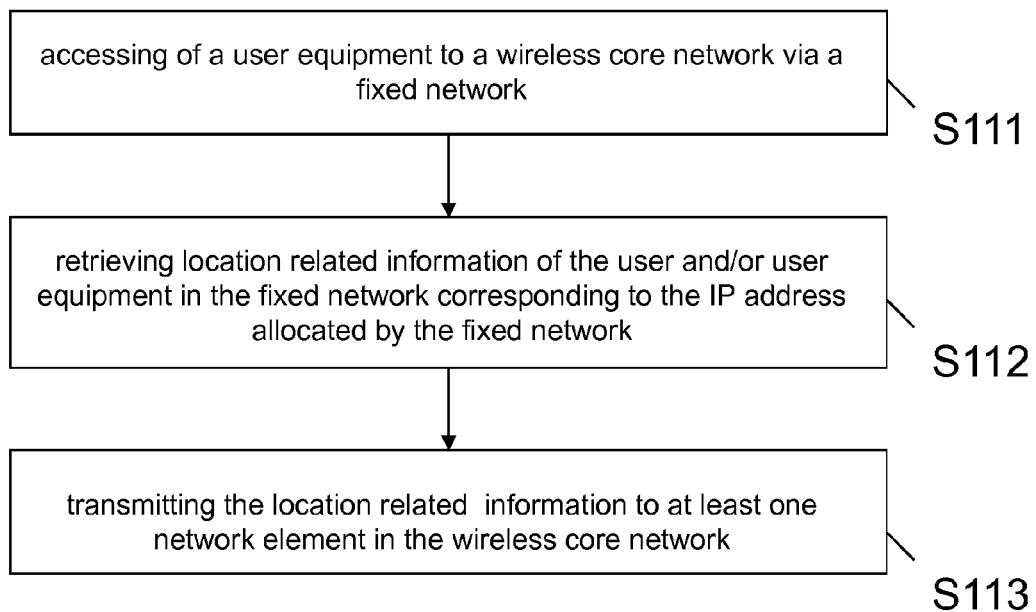
FIG. 1 shows a principle configuration of an example for a method according to certain embodiments of the present invention.

Exemplary aspects of the present invention will be described herein below. More specifically, exemplary aspects of the present invention are described hereinafter with reference to particular non-limiting examples and to what are presently considered to be conceivable embodiments of the present invention. A person skilled in the art will appreciate that the invention is by no means limited to these examples, and may be more broadly applied.

It is to be noted that the following description of the present invention and its embodiments mainly refers to specifications being used as non-limiting examples for certain exemplary network configurations and deployments. Namely, the present invention and its embodiments are mainly described in relation to 3GPP specifications being used as non-limiting examples for certain exemplary network configurations and deployments. In particular, a SAE/LTE communication system is used as a non-limiting example for the applicability of thus described exemplary embodiments. As such, the description of exemplary embodiments given herein specifically refers to terminology which is directly related thereto. Such terminology is only used in the context of the presented non-limiting examples, and does naturally not limit the invention in any way. Rather, any other network configuration or system deployment, etc. may also be utilized as long as compliant with the features described herein.

Hereinafter, various embodiments and implementations of the present invention and its aspects or embodiments are described using several alternatives. It is generally noted that, according to certain needs and constraints, all of the described alternatives may be provided alone or in any conceivable combination (also including combinations of individual features of the various alternatives).

A general principle according to certain embodiments of the present invention is described next.

A permanent or static fixed line identifier/identification can be used as a location identifier in a similar way as e.g. a cell identifier is used in mobile networks. Such a fixed line identifier defines clearly or is clearly related to the physical location of the end of the subscriber line/wire. In a similar, way any other permanent or fixed type of information or classification or categorization, e.g. geographical coordinates, can be used for representing a user/UE location identifier.

The broadband network gateway BNG builds a mapping between the user/UE location information, e.g. the line identifier, and the IP interface of the fixed network user/UE, wherein the IP address may be dynamically allocated to the user/UE or statically configured (refer e.g. to IETF RFC 6320/subclause 5.1). In the latter case the mapping may then be statically configured, too.

When a policy and charging rules function PCRF contacts a broadband network policy control function BPCF after the IP connectivity access network IP-CAN session establishment for setting up an S9a control session between BPCF and PCRF, the BPCF uses the tunnel information, i.e. the IP tunnel address received from PCRF, to retrieve the user/UE location information, e.g. the line identifier of the subscriber line, corresponding to the IP tunnel address of the digital subscriber line access multiplexer DSLAM end of the tunnel, i.e. the IP address allocated earlier by the fixed broadband access network to the fixed network user/UE, and sends the user/UE location information, e.g. the line identifier, to the PCRF.

The PCRF sends the line identifier, accompanied with relevant 3GPP user/UE identification, to the proxy call server control function P-CSCF and possibly to other network elements that may need the user location information, e.g. to a policy and charging enforcement function PCEF/packet data network gateway PGW/gateway GPRS support node GGSN.

FIG. 1 shows a principle flowchart of an example for a method according to certain embodiments of the present invention.

In Step S111, a user equipment accesses to a wireless core network via a fixed network.

In Step S112, user/UE location information, e.g. the line identification information of the subscriber line of the fixed network, corresponding to the IP address (or user/UE identification of some other kind) allocated by the fixed network are retrieved.

In Step S113, the user/UE location information, e.g. the line identification information, is transmitted to network elements upon request thereof.

Figure 2:
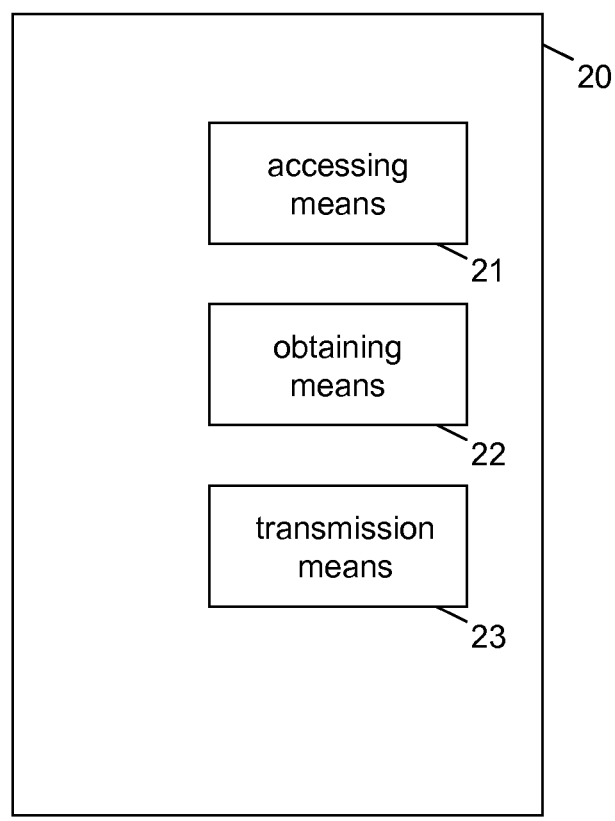
FIG. 2 shows a principle flowchart of an example for an apparatus according to certain embodiments of the present invention.

FIG. 2 shows a principle configuration of an example for an apparatus according to certain embodiments of the present invention. The apparatus 20 comprises accessing means 21 adapted to process accessing of a user equipment to a wireless core network via a fixed network, obtaining means 22 adapted to retrieve user/UE location information, e.g. line identification information of the subscriber line of the fixed network, corresponding to the IP address (or user/UE identification of some other kind) allocated by the fixed network, and transmission means 23 adapted to transmit the user/UE location information, e.g. the line identification information, to network elements, e.g. upon request thereof or unsolicited.

Figure 3:
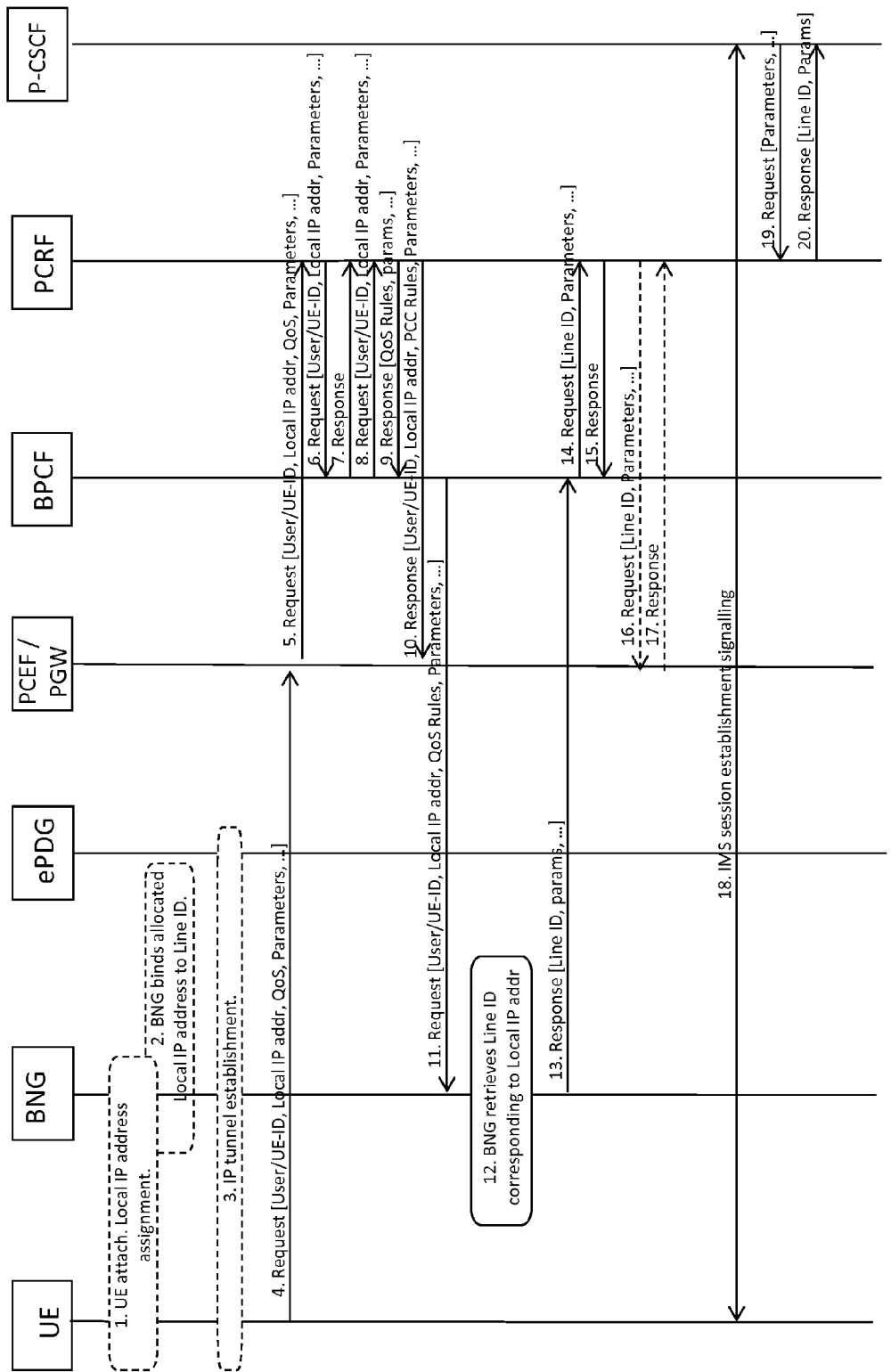
FIG. 3 schematically illustrates an operation in a use case of Fixed Broadband Access network interworking using WLAN.

FIG. 3 describes detailed operation in a use case of a fixed broadband access network interworking using WLAN access according to certain embodiments of the present invention. The line identifier/Line ID is used in this example to represent the user/UE location information. However, in a similar, way any other permanent or fixed type of information or classification or categorization, e.g. geographical coordinates, could be used/could apply here instead of the line identifier/Line ID.

For a reference architecture, it is herewith referred to the specification in 3GPP TS 23.139, subclause 4.2.2. Further, it is to be noted that only essential network elements are shown in FIG. 3.

In Step 1, a user equipment UE attaches to the fixed network via a WLAN. The fixed access network (e.g. BNG) assigns a local IP address to the UE.

In Step 2, the BNG binds the assigned UE local IP address and the line identifier of the local loop/line used by the residential gateway/RG (RG not shown in the figure) serving the UE.

In Step 3, the UE establishes an IP tunnel through the fixed access network with a gateway (evolved packet data gateway ePDG) in the 3GPP network.

In Step 4, the UE requests the establishment of an IP-CAN session by sending a request message through the IP tunnel to a 3GPP network gateway (PCEF/PGW). The message contains among other parameters, like user ID and requested quality of service QoS, also the UE local IP address allocated by the fixed access network.

In Step 5, the PCEF/PGW requests authorization and policy and/or charging control PCC rules from PCRF. The message contains among other parameters, like user ID and requested QoS, also the UE local IP address allocated by the fixed access network.

In Step 6, the PCRF finds the BPCF with the help of the received address/realm parameters and requests the BPCF to set up a control session towards the PCRF (as per current 3GPP specifications).

In Step 7, the BPCF acknowledges.

In Step 8, the BPCF sends a request to set up a control session towards the PCRF.

In Step 9, the PCRF responds to BPCF, including e.g. relevant QoS Rules.

In Step 10, the PCRF responds to PCEF, including e.g. relevant PCC Rules.

In Step 11, the BPCF finds the BNG with the help of the received address/realm parameters and sends a request to establish a control session with the BNG. Among other parameters like QoS rules, the request contains the UE local IP address.

In Step 12, the BNG retrieves the Line ID corresponding to the UE Local IP address.

In Step 13, the BNG sends a response to BPCF. Among other parameters the request contains the Line ID.

In Step 14, the BPCF sends the Line ID, with possible other parameters, to PCRF.

In Step 15, the PCRF acknowledges.

In Step 16, the PCRF may send the Line ID to other network elements, e.g. to PCEF/PGW as in the figure, that may need the Line ID e.g. for location related services or actions.

In Step 17, the receiving network element, i.e. PCEF/PGW in FIG. 3, acknowledges.

In Step 18, the UE establishes an IMS session.

In Step 19, related to the IMS session establishment, the P-CSCF sends a request message with related session information and parameters to PCRF.

In Step 20, the PCRF sends a response. The response message contains, among other parameters, also the Line ID. According to certain embodiments, the sending of the line ID may be dependent on whether the P-CSCF has, within a previous step, subscribed to receiving user location information from PCRF.

After Step 20, the session establishment proceeds as per current specifications.

In other words, according to the present invention, a permanent or static/fixed type of information or classification or categorization, e.g. geographical coordinates or a line identifier/identification, can be used as a location identifier in a similar way as e.g. a cell identifier is used in mobile networks. Such information, e.g. a fixed line identifier, can clearly define or can clearly be related to the physical location of the end of the subscriber line/wire or the user/UE. Moreover, information of the type of classification or categorization can clearly define or can be clearly related to the logical location or position of the user/UE.

Thereby, the Broadband Network Gateway BNG builds a mapping between the user/UE location information, e.g. the line identifier, and the IP interface of the fixed network user/UE.

When the policy and charging rules function PCRF contacts broadband network policy function BPCF after the IP-CAN session establishment for setting up an S9a control session between BPCF and PCRF, the BPCF uses the tunnel information, i.e. the IP tunnel address received from PCRF, to retrieve the user/UE location information, e.g. the line identifier of the subscriber line, corresponding to the IP tunnel address of the DSLAM end of the tunnel, i.e. the IP address (or user/UE identification of some other kind) allocated earlier by the fixed broadband access network to the fixed network user/UE, and sends the user/UE location information, e.g. the line identifier, to PCRF.

Then, the PCRF sends the user/UE location information, e.g. the line identifier, accompanied with relevant 3GPP user/UE identification, to P-CSCF and possibly to other network elements that may need the user location information, e.g. to PCEF/PGW/GGSN.

A similar use case to fixed broadband access network interworking using WLAN access would be fixed broadband access network interworking using H(e)NB, (for a reference architecture refer to 3GPP TS 23.139/subclause 4.3.2).

In general, according to the present invention, crucial elements are the policy and charging rules function PCRF, the broadband network policy control function BPCF, and broadband network gateway BNG.

According to certain embodiments of the present invention, a new parameter for the fixed network user location, e.g. the line ID, is added to policy control related interfaces between the elements and to Rx interface between PCRF and P-CSCF.

The most important use case is obviously the emergency services, which cannot locate the user without user location information. But in general, any location based service is a use case for this proposal.

In the foregoing exemplary description of the apparatus, only the units that are relevant for understanding the principles of the invention have been described using functional blocks. The apparatuses may comprise further units that are necessary for its respective function. However, a description of these units is omitted in this specification. The arrangement of the functional blocks of the apparatuses is not construed to limit the invention, and the functions may be performed by one block or further split into sub-blocks.

According to exemplarily embodiments of the present invention, a system may comprise any conceivable combination of the thus depicted devices/apparatuses and other network elements, which are arranged to cooperate as described above.

Embodiments of the present invention may be implemented as circuitry, in software, hardware, application logic or a combination of software, hardware and application logic. The software, application logic and/or hardware generally, but not exclusively, may reside on the devices' modem module. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer or smart phone, or user equipment.

As used in this application, the term "circuitry" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present. This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

The present invention relates in particular but without limitation to mobile communications, for example to environments under GSM, HSDPA, UMTS, LTE, WCDMA, WIMAX and WLAN and can advantageously be implemented also in controllers, base stations, user equipments or smart phones, or personal computers connectable to such networks. That is, it can be implemented as/in chipsets to connected devices, and/or modems thereof.

If desired, the different functions discussed herein may be performed in a different order and/or concurrently with each other. Furthermore, if desired, one or more of the above-described functions may be optional or may be combined.

In the claims, the term location related information is used to mean any type of data that can be used to link the UE or the user to a specific physical location. Such data could be line identification, location identification, telephone number of a fixed line, postal code, geographical coordinates or other location information.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense.

Rather, there are several variations and modifications which may be made without departing from the scope of the present invention as defined in the appended claims.

The following meanings for the abbreviations used in this specification apply:

3GPP 3$^{rd}$ generation partnership project
ANCP Access node control protocol
AP Access point
API Application programming interface
BNG Broadband network gateway
BPCF Broadband network policy control function
DSLAM Digital subscriber line access multiplexer
ePDG Evolved packet data gateway
GGSN Gateway GPRS support node
GPRS General packet radio service
GW Gateway
HNB Home Node-B
HSDPA High speed downlink packet access
ID Identity, Identifier
IP Internet protocol
IP-CAN IP connectivity access network
LTE Long term evolution
PC Policy and/or charging
PCC Policy and/or charging control
PCEF Policy and charging enforcement function
PCRF Policy and charging rules function
P-CSCF Proxy call server control function
PGW Packet data network gateway
QoS Quality of service
SAE System architecture evolution
UE User equipment
UMTS Universal mobile telecommunications system
WCDMA Wideband code division multiple access
WiMAX Worldwide interoperability for microwave access
WLAN Wireless local area network

What is claimed is:

1. A method, comprising:
receiving a request at a policy and charging rules function from a user equipment for access to a wireless core network via a fixed network, wherein the request comprises a local internet protocol address allocated by the fixed network for the user equipment;
contacting a broadband network policy control function for setting up a control session between the policy and charging rules function and the broadband network policy control function, wherein the broadband network policy control function uses the local internet protocol address received from the policy and charging rules function to retrieve location related information of the user equipment corresponding to the local internet protocol address via a broadband network gateway;
retrieving the location related information of the user equipment in the fixed network from the broadband network policy control function; and
transmitting the location related information of the user equipment in the fixed network from the policy and charging rules function to at least one network element in the wireless core network, wherein the at least one network element comprises a policy and charging enforcement function, and wherein the transmitting of the location related information is unsolicited.

2. The method according to claim 1, wherein the broadband network policy control function transmits the location related information to the policy and charging rules function.

3. The method according to claim 1, wherein the transmission of the location related information is accompanied by user equipment identification information.

4. The method according to claim 1, wherein the location related information of the user equipment comprises line identification information of a subscriber line of a fixed network.

5. The method according to claim 4, wherein the user location information is transmitted to at least one of the policy and charging enforcement function, packet data network gateway, and a general packet radio service gateway support node.

6. An apparatus, comprising:
at least one memory comprising computer program code;
at least one processor;
wherein the at least one memory and the computer program code are configured, with the at least one processor, to cause the apparatus at least to:
receive a request at a policy and charging rules function from a user equipment for access to a wireless core network via a fixed network, wherein the request comprises a local internet protocol address allocated by the fixed network for the user equipment;
contact a broadband network policy control function for setting up a control session between the policy and charging rules function and the broadband network policy control function, wherein the broadband network policy control function uses the local internet protocol address received from the policy and charging rules function to retrieve location related information of the user equipment corresponding to the local internet protocol address via a broadband network gateway;
retrieve the location related information of the user equipment in the fixed network from the broadband network policy control function; and
transmit the location related information of the user equipment in the fixed network from the policy and charging rules function to at least one network element in the wireless core network, wherein the at least one network element comprises a policy and charging enforcement function, and wherein the transmitting of the location related information is unsolicited.

7. The apparatus according to claim 6, wherein the broadband network policy control function is adapted to transmit the location related information to the policy and charging rules function.

8. The apparatus according to claim 6, wherein the transmission of the location related information is accompanied by user equipment identification information.

9. The apparatus according to claim 6, wherein the location related information of the user equipment comprises line identification information of a subscriber line of a fixed network.

10. The apparatus according to claim 9, wherein the user location information is transmitted to at least one of the policy and charging enforcement function, packet data network gateway, and a general packet radio service gateway support node.

11. A computer program product embodied on a non-transitory computer-readable medium, said product comprising computer-executable components which, when the program is run on a processing device, are configured to carry out the method according to claim 1.

* * * * *